Aug. 22, 1944.　　　C. E. STRECKER　　　2,356,630
SWING GATE VALVE
Filed July 10, 1941　　　2 Sheets-Sheet 1
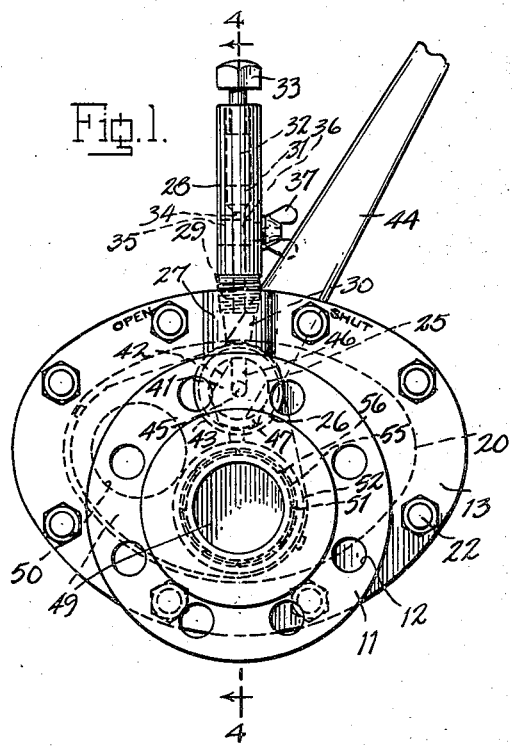
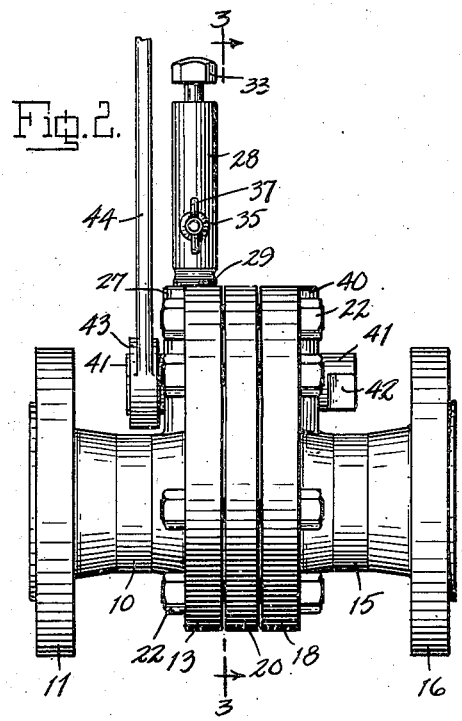
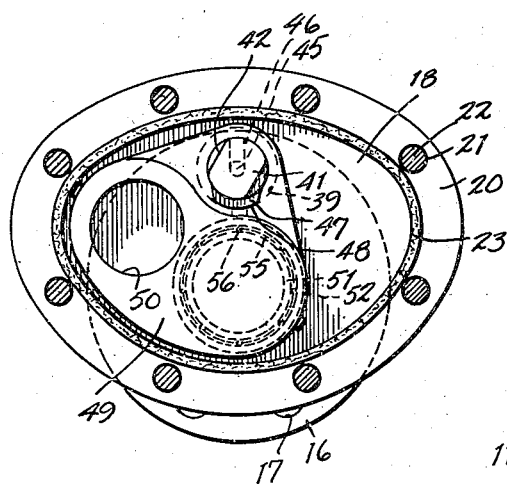
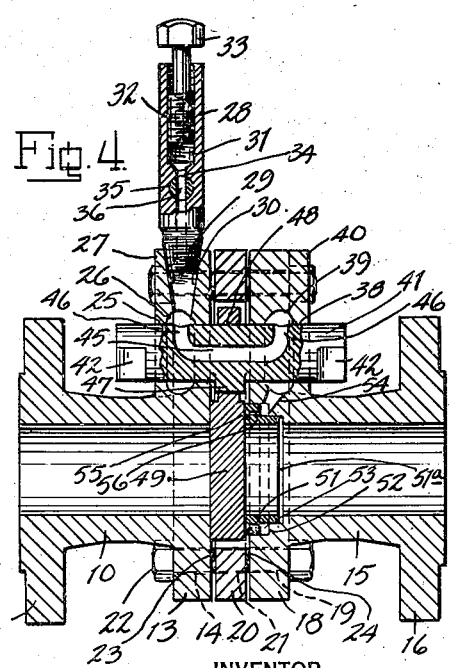
INVENTOR
CHARLES E. STRECKER.
BY
ATTORNEY Aug. 22, 1944. C. E. STRECKER 2,356,630
SWING GATE VALVE
Filed July 10, 1941 2 Sheets-Sheet 2
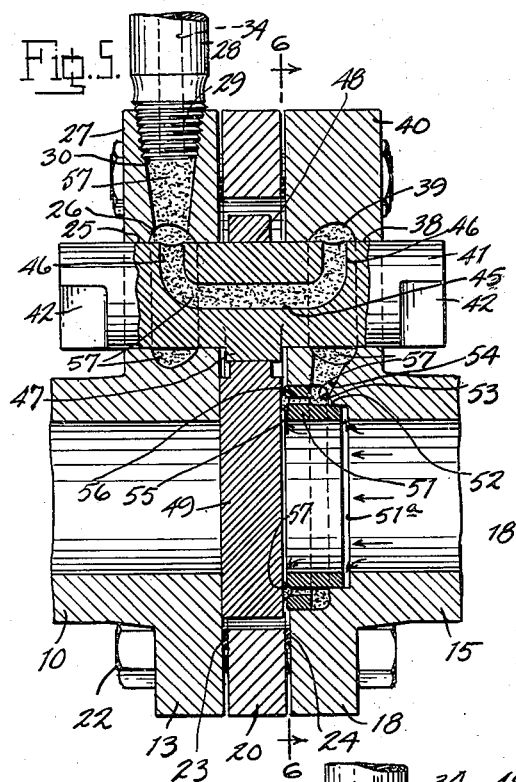
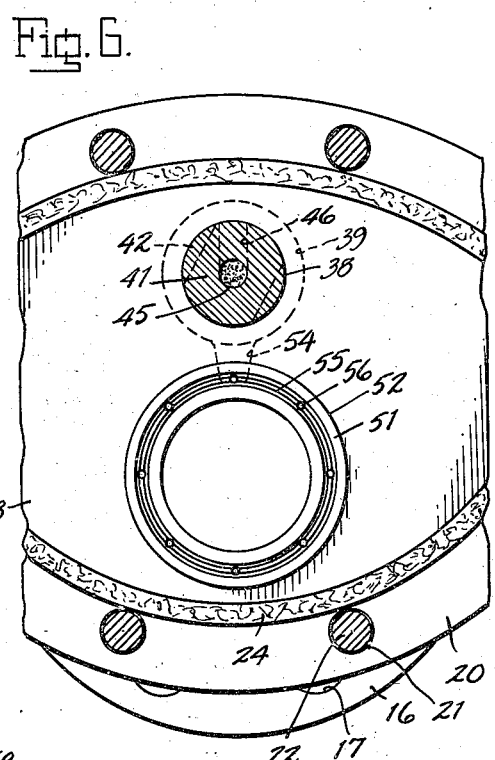
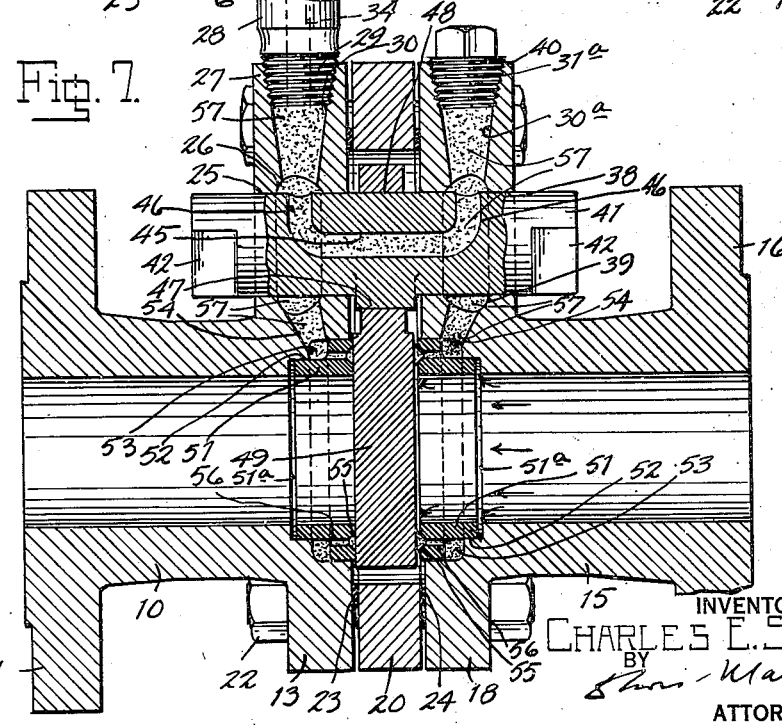
INVENTOR
CHARLES E. STRECKER.
BY
ATTORNEY Patented Aug. 22, 1944

2,356,630

UNITED STATES PATENT OFFICE 2,356,630

SWING GATE VALVE

Charles E. Strecker, Arlington, N. J., assignor to Encor Corporation, Belleville, N. J., a corporation of New Jersey Application July 10, 1941, Serial No. 401,733

2 Claims. (Cl. 251—18)

The present invention relates to a swing gate valve, specially intended for use with gaseous or liquid fluids which require a leak-proof seal under such conditions as high pressure, high temperature, volatility, or the like.

It is an object of the invention to provide a swing gate valve, having a solid swing gate member for closing and opening the conduit through the valve, at the inlet side of which there is provided in the valve body a sealing ring for sealing engagement with a surface of a swing gate member, and to provide pressure means in the form of a sealing and lubricating heavy plastic packing material acting upon the sealing ring, such plastic material being forced behind the ring and through ports to the seating surface, for establishing a seal and constituting a lubricant to enable the valve gate to be operated to opened or closed position with facility.

A further object is to provide a sealing ring so disposed in relation to the line pressure in the conduit that such line pressure will act directly upon the sealing ring to force it toward the seating surface of the swing gate. It is further proposed to provide sealing rings in which a spring means for exerting sealing pressure is dispensed with, the sealing of the ring being accomplished through the combined action of the plastic material under pressure behind the ring and the direct action of the line pressure upon the ring.

A further object is to provide a valve structure which will mould the plastic material constituting the seal into a tapered cross-sectional shape diverging outwardly toward the seating surfaces, so that the inclined surface of the plastic material exposed to the pressure of the fluid within the conduit of the valve will be acted upon by the pressure substantially at right angles to the inclined surface. Thus, instead of causing the sealing material to be displaced by the pressure to break the seal, the pressure forces the inclined surfaced fin-like section of the seal against the seating surface. This action is somewhat similar to the well-known hat packing used in connection with pistons, and wherein the margin of the hat packing opposes a tapered fin-like surface to the pressure, the force of the pressure acting as a wedge between the inclined surfaced margin of the packing and the piston to force the packing tightly against the cylinder wall.

The material employed for hat packing is usually leather or an impregnated fabric, whereas in the present invention it is proposed to employ a heavy plastic material which may be forced into place through pressure, and may be renewed when desired simply by adding more plastic and forcing this under pressure to the valve seat, the consistency of the material being such that it provides a tough and tenacious fin-like sealing structure which will not deteriorate under the effect of the fluid passing through the valve. While such material may be of any suitable type to produce the desired results, it is particularly proposed to provide a material formed from a combination of vegetable or animal substances and mineral substances, as for instance castor oil, paraffin, coal tar, or the like, constituting the animal and vegetable ingredients, and graphite, mica, asbestos, or the like, constituting the mineral ingredients. In practice these will be proportioned depending upon the particular requirements, the plastic material for a valve to be used in connection with a fluid at very high temperatures having an increased amount of mineral ingredients, while material for use with cold fluids, either liquid or gaseous, may have an increased amount of animal and vegetable ingredients. This material may be provided in stick form so that it may be conveniently inserted in the pressure gun of the valve.

It is a further object to provide means in relation to the stem of the valve gate for receiving the plastic material to constitute a seal and lubricant means for the stem, such means being in communication with the means for supplying the plastic to the valve seat.

Another object is to provide a valve in which the valve gate operating stem projects symmetrically at each side of the valve body and may be engaged and manipulated by a wrench at either side of the valve. It is further proposed, in one embodiment of the invention, to provide a valve of symmetrical form at each side of the valve gate, having similar sealing means at each side, so that the valve is capable of two-directional use, without the necessity of reversing the position of the valve in the pipe line.

With the above and other objects in view embodiments of the invention are shown in the accompanying drawings, and these embodiments will be hereinafter more fully described with reference thereto, and the invention will be finally pointed out in the claims.

In the drawings:

Fig. 1 is an end view of a swing gate valve, according to an exemplary embodiment of the invention, the swing gate being shown in closed position.

Fig. 2 is a side elevation.

Fig. 3 is a transverse sectional view, taken along the line 3—3 of Fig. 2, and showing the swing gate chamber of the valve.

Fig. 4 is a vertical longitudinal sectional view, taken along the line 4—4 of Fig. 1.

Fig. 5 is a fragmentary sectional view, similar to Fig. 4, and on an enlarged scale.

Fig. 6 is a fragmentary vertical sectional view, taken along the line 6—6 of Fig. 5.

Fig. 7 is a longitudinal vertical sectional view similar to Fig. 5, showing a modified form of the invention, in which sealing rings are provided in the valve body at each side of the valve gate.

Similar reference characters indicate corresponding parts throughout the several figures in the drawings.

Referring to the drawings, the swing gate valve, according to the exemplary embodiment of the invention shown in Figs. 1 to 6, inclusive, comprises a valve body consisting of a tubular conduit member 10 at one side, having a circular pipe-fastening flange 11 at its outer end provided with bolt holes 12 for securing an adjacent section of pipe thereto, and provided at its inner end with a wall flange 13, of substantially oval shape, and provided with a series of bolt holes 14 in its marginal portion. The inner face of this flange 13 is adapted to constitute one wall of the valve gate chamber, which is of horizontally elongated oval form to receive the swing gate and permit it to be swung between opened and closed positions. A substantially similar tubular conduit member 15 forms the other side of the valve body and is provided at its outer end with a circular pipe-fastening flange 16, having bolt holes 17 for securing an adjacent length of pipe thereto, and provided at its inner end with an oval-shaped wall flange 18 corresponding in outline to the wall flange 13 of the conduit member 10, and provided in its marginal portion with bolt holes 19.

Between the two conduit members there is provided a center-piece in the form of an oval ring 20, conforming to the outline of the wall flanges 13 and 18 and adapted to constitute the peripheral wall of the valve gate chamber, being provided with a series of bolt holes 21. The wall flanges 13 and 18 of the two conduit members and the center-piece 20 are secured together by bolts 22 engaged through the aligned bolt holes of these three members, suitable packing rings 23 and 24 being disposed between the surfaces of the flanges and the center-piece and being compacted into sealed relation by tightening of the bolts.

The wall flange 13 of the conduit member 10 is provided in vertically aligned position above the conduit with a valve-stem bearing passage 25 provided between its ends with an annular plastic-receiving space 26 surrounding the bearing passage and adapted, as will presently more fully appear, to provide a plastic seal for the valve stem. The wall flange 13 is provided upon its outer side with a bearing enlargement 27 extending vertically between the hub and the periphery for providing a sufficiently large body of metal at this point for the bearing passage 25 and the annular space 26. The enlargement 27 also provides a mounting for the plastic material pressure gun element 28, the tapered end 29 of which is screwed into a tapered threaded opening 30 in the enlargement which extends to the annular plastic receiving space 26. The pressure gun is provided at its outer end with an enlarged threaded reservoir 31 for receiving plastic material, and a pressure screw 32 is engaged therein, having a nut head 33 at its outer end for turning the pressure screw by means of a suitable wrench. A passage 34 extends from the reservoir 31 to the passage 30, and within this passage 34 there is provided a transverse stop-cock 35 which in its open position has its passage 36 aligned with the passage 34 and in its closed position closes the passage 34. The stop-cock is provided with a wing nut operating handle 37.

The wall flange 18 is provided in vertically aligned position above the conduit with a stem-bearing passage 38 in axial alignment with the stem-bearing passage 25 of the wall flange 13, and between the ends of the passage 38 there is provided an annular plastic-receiving space 39. The wall flange is provided with a vertically disposed bearing enlargement 40 corresponding to the bearing enlargement 27 of the wall flange 13 for the purpose of providing a sufficiently long body of metal at this point for the bearing passage 38, and the annular space 39.

The cylindrical valve stem 41 has bearing in the bearing passages 25 and 38 and projects at its ends with respect to the bearing enlargements 27 and 40 of the wall flanges 13 and 18, where it is provided at each end with flats 42 for engagement by the hub 43 of a wrench 44, it being understood that this wrench may be engaged with either end of the stem to suit the convenience of the operator. The stem is provided with an axial passage 45 terminating at its ends in radially-disposed passages 46—46 extending to the surface of the stem at points in register with the respective annular plastic-receiving spaces 26 and 39, and providing a feed duct between the annular space 26 to which the plastic material is supplied by the pressure gun and the annular space 39, which is adapted to supply the plastic material to the conduit sealing ring, as will presently more fully appear.

Centrally of the valve stem there is provided within the valve gate chamber a segmental key-lug portion 47, which is non-rotatably engaged with the correspondingly shaped passage 48 of the hub of the valve gate member 49. This valve gate member is of one-piece segmental form, its lower conduit closing and opening portion, which is relatively thicker than the hub portion, being solid at one side of its radial center line to close the conduit in the closed position of the valve gate, and having a circular port opening 50 in its other side which in the opened position of the valve gate registers with the conduit to allow the passage of fluid therethrough.

At the outlet side of the valve the valve gate seats upon the wall of the valve gate chamber provided by the inner surface of the wall flange 13 of the conduit member 10, while at the inlet side it is engaged by the sealing ring 51, which is of angular cross-sectional shape and is slidably engaged in an annular recess 52 provided in the conduit member 15, this recess being of angular form and its inner relatively larger diameter portion being substantially longer than the enlarged larger diameter seating face portion of the ring slidably engaged therein, so that an annular plastic-material receiving space 53 is provided in the corner formed by the angular cross-sectional shape of the ring. This space 53 is connected by a passage 54 to the annular plastic-material receiving space 39, so that the plastic material is forced from the passage 39 to the space 53. The outer end of the ring is spaced from the outer end of the recess 52 to provide an annular pocket 51ª of substantial width, and which permits the fluid in the valve to enter under pressure and thereby exert direct pressure of the fluid upon the ring in seating direction toward the valve gate.

In the sealing face of the ring 51 there is provided an annular groove 55 of tapered outwardly-diverging cross-section, and which is in communication with the annular recess 53 through a series of spaced ports 56 drilled through the ring from the groove 55 to the space 53, so that the plastic material may be forced to the groove 55 into sealing engagement with the valve gate. This constitutes a sealing means which acts in conjunction with the line pressure directly imposed upon the sealing ring in the space 51ª, and as will presently more fully appear.

The plastic sealing and lubricating material 57 is disposed as a continuous body within the passage 34 of the pressure gun, the passage 30 of the valve body, the annular stem-sealing space 26, the feed duct passage 45 through the stem, the annular stem-sealing space 39, the passage 54, the annular recess 53, the ports 56, and the sealing ring annular groove 55. Upon closing of the valve gate the pressure screw 33 is turned to compress the plastic material and cause it to flow into engagement with the valve gate surface under pressure.

At the pressure side of the valve the line pressure, indicated by arrows in Fig. 5, forces the valve gate against the valve seat at the opposed or zero pressure side, while at the line pressure side the line pressure enters the annular recess 51ª behind the sealing ring 51 forcing it toward the face of the valve gate and thereby providing a partial seal restricting the amount of pressure that may enter between the seating surface of the ring and the surface of the valve gate. The seal is completed by the sealing and lubricating plastic material 57 which is forced into the annular channel 55 against the valve gate surface by operation of the pressure gun, being forced against the surface of the valve gate in the form of a tapered wedge-shaped annular body, the marginal portions of which are tapered and fin-like and have their exposed annular surfaces each disposed at an obtuse angle to the valve gate surface. The inclined surface exposed to the line pressure, which enters the space which may remain between the sealing ring and the valve gate, is disposed substantially at right angles to the direction of the pressure against it, and consequently the pressure acts as a wedge between the inclined surface of the sealing material and the sealing ring, forcing the tapered fin-like edge of the sealing material tightly against the valve gate surface, the knife-like thinness of the edge pressed tightly in engagement with the valve seat preventing the pressure from entering between the plastic material and the valve gate surface. In the case of fluid which is not under appreciable pressure the plastic material in the annular recess 52 disposed behind the sealing ring under pressure applied by the pressure gun serves to force the sealing ring toward the valve gate. The sealing action of the plastic material against the valve gate surface is somewhat similar to the action of the cup-shaped hat gasket or leather as employed, for instance, in connection with a pump plunger or piston. While the plastic material is sufficiently pliable to flow through the spaces of the valve structure under pressure of the pressure gun, it is of such homogeneous consistency and of sufficient solidity and toughness that the fin-like sealing edge in engagement with the valve gate surface will not wash out under the effect of pressure or contact of the fluid in the valve. At the same time the material provides a lubricating medium in engagement with the surface of the valve gate to permit it to be opened and closed with facility.

In Fig. 7 I have illustrated a modification of the invention intended for two-directional use, so that it may be placed in a line and will operate with either side of the valve being the inlet side. The structure is substantially similar to the embodiment shown in Figs. 1 to 6, except that a sealing ring 52 is provided in an annular recess 53 at each side of the valve gate, the recess provided in the conduit member 10 being connected by a passage 54 with the annular plastic-material receiving space 26 and the recess in the conduit member 15 being connected by a passage 54 with the annular plastic receiving space 39. In this form the enlargement 40 of the wall flange 18 is preferably provided with a reservoir space or passage 30ª corresponding to the passage 30 of the enlargement 27, and which is provided with a removable screw plug 31ª having tapered screw threads engaged in the screw-threaded upper end of the passage 30ª. This reservoir 30ª provides an additional supply of plastic material and the plug 31ª may be removed therefrom and the pressure gun 31 engaged therewith in order to apply pressure to this material, it being understood that the pressure gun and plug may be interchangeably engaged in the passages 30 and 30ª. In the illustration the arrows indicate the right hand side of the valve as the pressure or inlet side, the valve gate being forced against the sealing ring 52 at the opposed side, and the line pressure and plastic seating material effecting a sealing of the ring 52 at the pressure side. In the case of the left hand side being the pressure or inlet side the operation will be reversed.

I have illustrated and described preferred and satisfactory embodiments of the invention, but it will be understood that changes may be made therein, within the spirit and scope thereof, as defined in the appended claims.

Having thus described my invention, what I claim and desire to secure by Letters Patent is:

1. In a gate valve, a valve body having a conduit therethrough and a valve gate chamber disposed transversely of said conduit having opposed walls surrounding said conduit, at least one of said chamber walls having an annular recess surrounding said conduit, a valve stem journaled in said valve body extending across said chamber in spaced parallel relation to said conduit, a valve gate slidably keyed to said stem and movably disposed in said chamber to open and close said conduit, said gate being of less width than said chamber and axially movable therein, valve ring means carried in said annular recess for relative axial movement therein at one side of said gate having an annular sealing portion for engagement with said gate surface at one side in surrounding relation to said conduit, said sealing portion having a continuous annular plastic material receiving space and communication channel means extending from said space to the inner side of said valve ring means, there being an annular space in said recess at the inner side of said ring means, and plastic material supply passage means extending to said annular space.

2. In a gate valve, a valve body having a conduit therethrough and a valve gate chamber disposed transversely of said conduit and having opposed walls surrounding said conduit, said walls each having an annular recess surrounding said conduit, a valve stem journaled in said valve body extending across said chamber in spaced parallel relation to said conduit, a valve gate slidably keyed to said stem and movably disposed in said chamber to open and close said conduit, said gate being of less width than said chamber and axially movable therein, valve ring means respectively carried in said annular recesses for relative axial movement therein at each side of said gate and each having annular sealing portions for engagement with said gate at each side in surrounding relation to said conduit, each of said valve ring means having in its sealing portion a continuous annular plastic material receiving space and communication channel means extending from said space to the inner side of said valve ring means, there being an annular space in each of said recesses at the inner side of each of said valve ring means, and plastic material supply passage means extending to said annular space.

CHARLES E. STRECKER.